United States Patent [19]
Morey

[11] Patent Number: 5,799,915
[45] Date of Patent: Sep. 1, 1998

[54] TWIST RACK FOR SNOWBOARDS

[75] Inventor: Dennis Earl Morey, Shelburne, Vt.

[73] Assignee: The Burton Corporation, Burlington, Vt.

[21] Appl. No.: 381,521

[22] Filed: Jan. 31, 1995

[51] Int. Cl.⁶ .................................................. F16M 11/00
[52] U.S. Cl. ........................................ 248/201; 248/488
[58] Field of Search .......................... 248/201, 224.7, 248/222.52, 221.12, 292.12, 294.1, 304, 306, 322, 488; 40/158.1; 403/103, 97, 96, 372, 367, 365; 211/70.5, 60.1, 89, 87

[56] References Cited

U.S. PATENT DOCUMENTS

| | | | |
|---|---|---|---|
| 1,210,934 | 1/1917 | Hayes | 248/488 |
| 1,510,978 | 10/1924 | Conklin | 248/304 X |
| 1,608,651 | 11/1926 | Farmer | 40/158.1 X |
| 1,930,656 | 10/1933 | Nave | 248/304 X |
| 3,049,323 | 8/1962 | Peterka | 248/201 X |
| 3,245,645 | 4/1966 | Dupler | 248/224.7 X |
| 3,347,504 | 10/1967 | Goss | 248/201 X |
| 3,394,790 | 7/1968 | Braun | 211/70.5 X |
| 3,424,418 | 1/1969 | Freedman et al. | 248/304 |
| 3,586,355 | 6/1971 | Magi . | |
| 4,312,467 | 1/1982 | Kulwin | 211/70.5 X |
| 4,345,732 | 8/1982 | Gallegor | 248/201 |
| 4,438,878 | 3/1984 | Heslop | 211/70.5 X |
| 4,779,180 | 10/1988 | Ruiz | 248/488 |
| 4,786,025 | 11/1988 | Shuman | 248/222.12 X |
| 5,183,164 | 2/1993 | Heinzle | 211/70.5 |
| 5,371,994 | 12/1994 | Waters | 268/488 X |
| 5,390,837 | 2/1995 | Ruffolo, Jr. | 248/201 X |
| 5,417,335 | 5/1995 | White | 211/70.5 |
| 5,477,968 | 12/1995 | Largent et al. | 211/70.5 X |

FOREIGN PATENT DOCUMENTS

| | | | |
|---|---|---|---|
| A-2418887 | 9/1979 | France . | |
| 4-115471 | 10/1992 | Japan . | |
| A-619125 | 9/1980 | Switzerland . | |
| 1455162 | 11/1976 | United Kingdom | 248/488 |

*Primary Examiner*—Leslie A. Braun
*Assistant Examiner*—Willie Berry, Jr.
*Attorney, Agent, or Firm*—Wolf, Greenfield & Sacks, P.C.

[57] ABSTRACT

A twist rack bracket for snowboards includes a base member which may be selectively connected to a wall. The bracket has a base member that has a bore and a front member that has an opposing surface with a shaft projecting therefrom. The shaft is disposed within the bore. A hollow sleeve is disposed about the shaft and within the bore. The sleeve is fixed with respect to the shaft. The sleeve and the front member are rotatably connected to the base member.

34 Claims, 2 Drawing Sheets

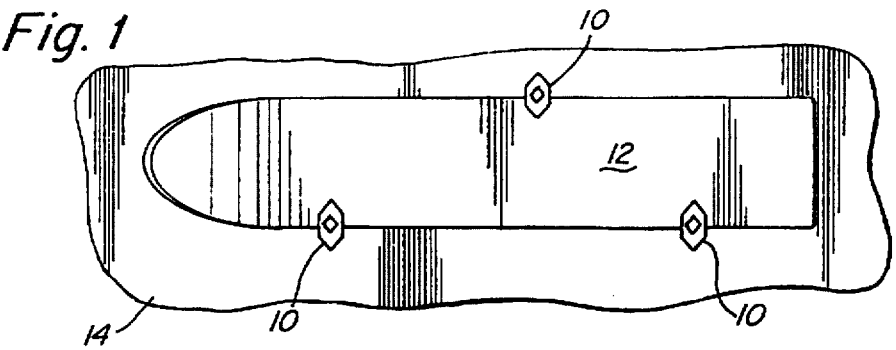
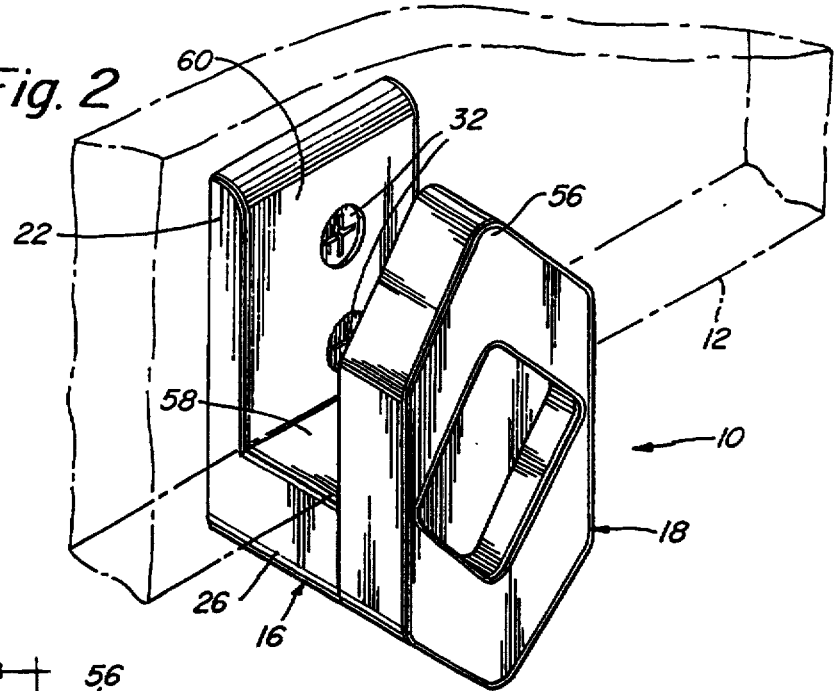
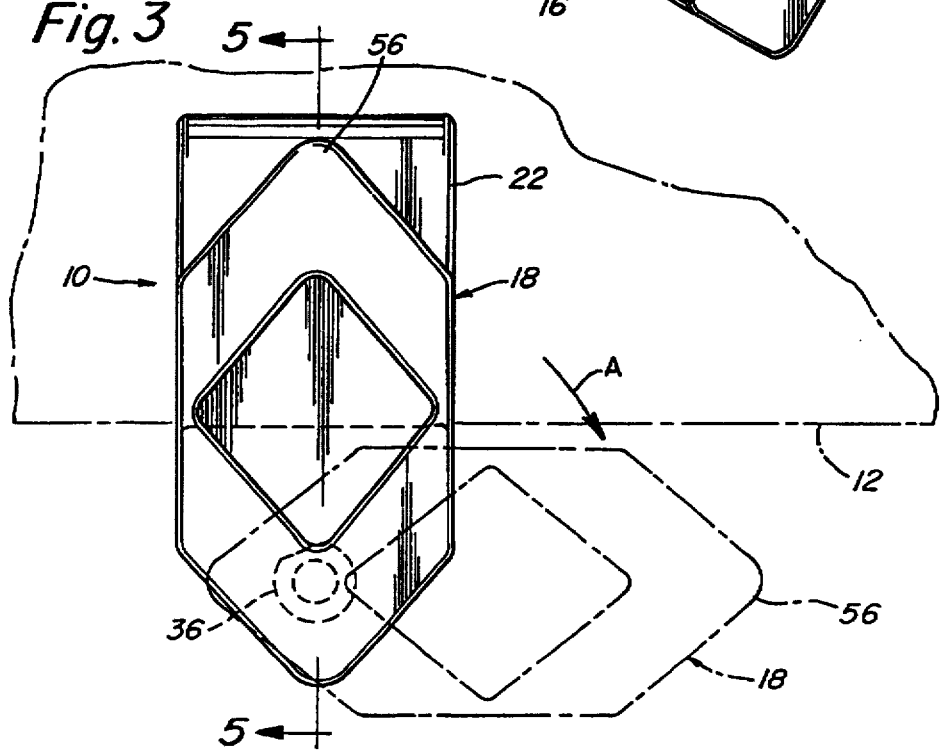

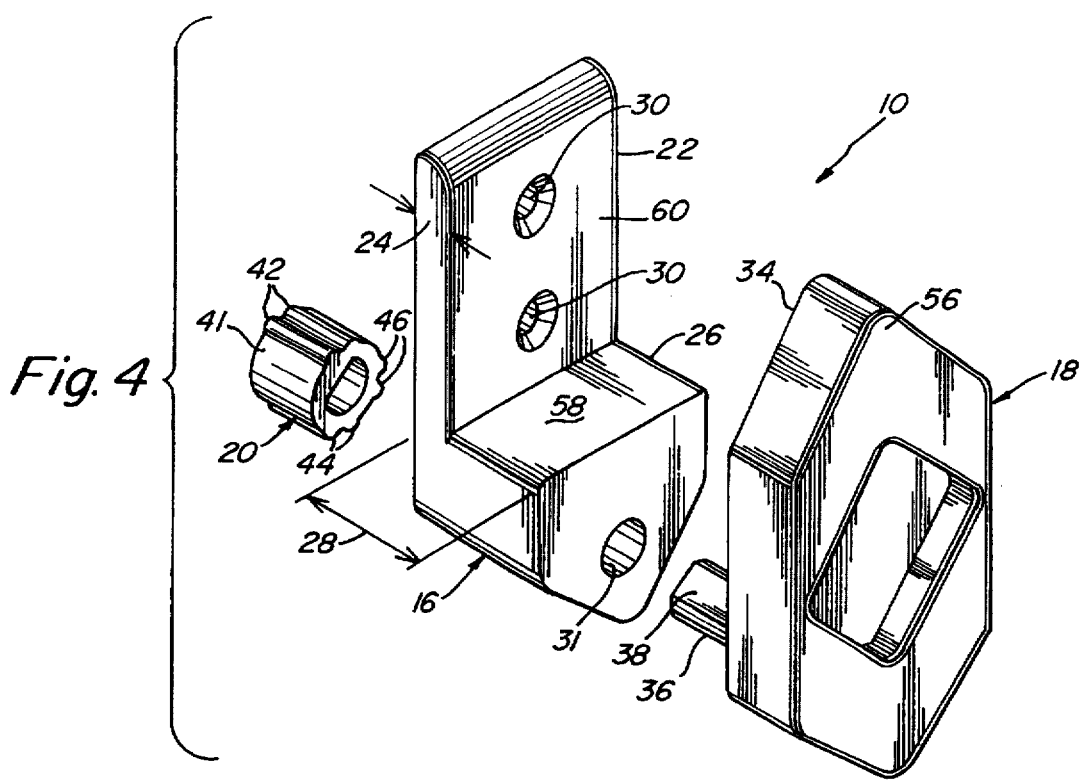
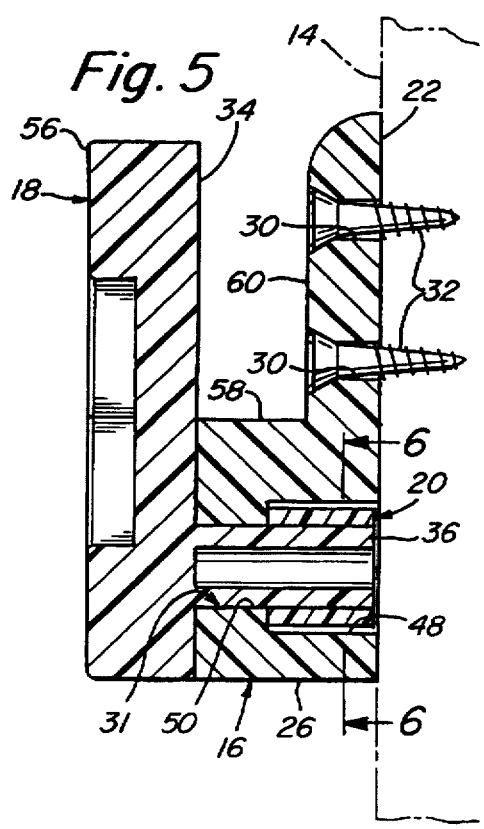
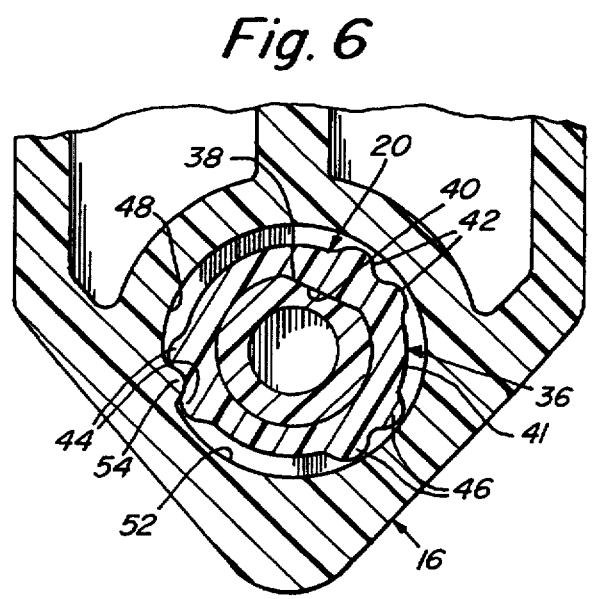

TWIST RACK FOR SNOWBOARDS

FIELD OF THE INVENTION

The present invention relates to a bracket. More specifically, the present invention relates to a bracket for holding a snowboard against a wall.

BACKGROUND AND SUMMARY OF THE INVENTION

Snowboarding has recently become a very popular sport. However, while the snowboard is not in use, the snowboard is typically stored by simply placing the board against any available wall space. However, storing a snowboard in this manner has created problems in that the bottom and side edges of the board often become damaged. Accordingly, there is a need in the art for a bracket which can hold a snowboard on a wall, so that the edges of the snowboard will not become damaged. In addition, it is an object of the present invention to provide a bracket that permits the snowboard to be placed easily into the stored position and thereafter with only a minor repositioning of each bracket, can be placed such that the snowboard is locked to the bracket. It is a further object of the present invention to provide a bracket which permits the snowboard to be stored against a wall in a secure manner, while simultaneously permitting easy removal of the snowboard from the brackets.

In accordance with a preferred embodiment, demonstrating further objects, features and advantages of the invention, a snowboard bracket includes a base member that can be connected selectively to a wall. The base member has a throughbore. A front member has a rear surface with a shaft projecting therefrom. The shaft is disposed within the throughbore of the base member. A hollow sleeve is disposed about the shaft and within the bore. The sleeve is fixed with respect to the shaft, so that the sleeve and the front member are rotatably connected to the base member.

BRIEF DESCRIPTION OF THE DRAWINGS

The above and further objects, features and advantages of the present invention will become apparent upon consideration of the following detailed description of a specific embodiment thereof, especially when taken in conjunction with the accompanying drawings wherein like reference numerals in the various figures are utilized to designate like components, and where FIG. 1 shows a front elevational view of three of the brackets according to the present invention being used to hold a snowboard against a wall;

FIG. 2 shows a fragmentary perspective view, on an enlarged scale, showing one of the lower brackets of FIG. 1;

FIG. 3 shows a plan view of the bracket according to the present invention;

FIG. 4 shows an exploded view of a bracket according to the present invention;

FIG. 5 shows a side sectional view of the bracket according to the present invention taken along line 5—5 of FIG. 3 and looking in the direction of the arrows; and FIG. 6 shows a sectional view taken along lines 6—6 of FIG. 5 and looking in the direction of the arrows.

DETAILED DESCRIPTION OF THE PRESENTLY PREFERRED EXEMPLARY EMBODIMENTS OF THE PRESENT INVENTION

Referring now to FIG. 1, several brackets 10 according to the present invention are illustrated holding a snowboard 12 against a wall 14.

Bracket 10 includes a base member 16, a front member 18 and a hollow sleeve 20. Base member 16 includes a first portion 22 having a predetermined first thickness 24 and a second portion 26 having a predetermined second thickness 28. As illustrated, the first thickness 24 is smaller than the second thickness 28. The first portion 22 of the base member has a pair of throughbores 30 which constitute a means for permitting the base to be selectively connected to wall 14 by a pair of screws 32. The second portion 26 of the base member 16 has a stepped throughbore 31.

Front member 18 has a rear surface 34 with a shaft 36 projecting rearwardly therefrom. Shaft 36 is integral with front member 18 and is disposed within bore 31. Bracket 10 has a U-shaped recess with the width of the recess being only slightly greater than the width of a snowboard so that the board will be securely fastened within the bracket.

Hollow sleeve 20 is disposed about shaft 36 and within bore 31 as illustrated in FIG. 5. Sleeve 20 is fixed with respect to shaft 36. The fixed connection between shaft 36 and the sleeve 20 is preferably made by a flat surface 38 disposed on an outer surface of shaft 36 and a corresponding flat surface 40 disposed on an inner surface of sleeve 20 which mates with the flat surface of the shaft. However, it is to be understood that sleeve 20 could be connected to the shaft 36 by various other structures including, but not limited to, a splined connection, a friction fit, etc. Sleeve 20 and front member 18 are rotatably connected to base member 16 to permit the front member 18 to be rotated or pivoted in the direction indicated by arrow A in FIG. 3 to the position illustrated in phantom so that the snowboard 12 can easily be removed from the bracket. Of course, front member 18 could be pivoted with respect to the base member in the direction opposite of Arrow A. It is to be understood that it is preferred that all three brackets be pivoted to a position similar to that of FIG. 3 to permit the removal and/or insertion of the snowboard.

As illustrated in FIG. 4, sleeve 20 has an outer surface 41 having preferably three pairs of adjacent axial projections 42, 44 and 46. Bore 31 is a stepped bore having a larger diameter portion 48 and a smaller diameter portion 50. The larger diameter portion 48 has an inner surface 52 that has one axial projection 54. Axial projection 54 has a length that is substantially equal to the length of each pair of axial projections 42, 44 and 46. As illustrated in FIG. 4, the pairs of axial projections 42, 44 and 46 are disposed along substantially the entire axial length of sleeve 20 and are substantially equally spaced from one another in the circumferential direction. Likewise, axial projection 54, on the inner surface 52 of bore 31 is disposed along substantially the entire length of the enlarged diameter portion 48 and, it follows, only along a portion of the total axial length of bore 31.

In operation, the user will first pivot the front member 18 to a position so that the entire upper portion 56 of front member 18 is disposed below an upper flat surface 58 of base member 16. However, it is to be understood that the upper bracket 10 illustrated in FIG. 1 is to be pivoted so that portion 56 of the front member 18 is disposed above the flat surface 58. The user can now place snowboard 12 against a surface 60 of base member 16 of each of the three brackets. Once the snowboard is in place, the user can simply pivot each of the front members 18 back to the upright position as illustrated in FIG. 2. During the pivoting movement, the user will feel the pairs of adjacent projections 42, 44 and 46, snap into the projection 54 on the bore member. The projections are spaced such that one of the pairs of adjacent members, for example, pair 44 aligns with a predetermined upright position as illustrated in FIG. 2. The other two pairs of adjacent projections 42, 46 are disposed at predetermined pivotal positions either clockwise or counterclockwise with respect to the upright position so that the snowboard can be easily placed in the stored position, as illustrated in phantom in FIG. 3. Accordingly, the user will feel front member 16 as it is pivoted, so that it snaps into the three predetermined positions.

Having described the presently preferred exemplary embodiment of a new and improved twist rack for snowboards, in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

We claim:

1. A bracket to mount a snowboard to a wall, the bracket comprising:

a base member adapted to be mounted to the wall; and no more than one front member rotatable attached to said base member, said front member being adapted to rotate between a first position wherein the bracket is arranged to secure the snowboard between said base and front members, and a second position wherein the bracket is arranged to release the snowboard, wherein one of said base and front members has a bore and the other has an opposing surface with a shaft projecting therefrom, said shaft being disposed within said bore, and wherein said base member include a first locking element and said front member includes a second locking element adapted to mate with said first locking element to inhibit rotation of said front member and lock said front member in said first position.

2. The bracket according to claim 1, wherein said one member includes a first portion having a first thickness and a second portion having a second thickness, said first thickness being less than said second thickness.

3. The bracket according to claim 2, wherein said bore is disposed within said second portion of said one member.

4. The bracket according to claim 3, wherein said bore is a throughbore.

5. The bracket according to claim 3, wherein said bore is disposed in said base member and said shaft projects from said surface of said front member.

6. The bracket recited in claim 1, wherein said base member includes a first surface adapted to extend along the wall when said base member is mounted thereto, and wherein said front member is rotatable attached to said base member about an axis that is perpendicular to said first surface.

7. The bracket according to claim 6, in combination with the snowboard.

8. The bracket recited in claim 1, wherein said base and front members are rigid.

9. The bracket according to claim 1, in combination with the snowboard.

10. The bracket according to claim 1, wherein one of said first and second locking elements is supported on said shaft and the other of said first and second locking elements is disposed in said bore.

11. A bracket comprising:

a base member having means for being selectively connected to a wall;

a front member;

one of said base and front members having a bore and the other thereof having an opposing surface with a shaft projecting therefrom, said shaft being disposed within said bore; and a hollow sleeve being disposed about said shaft and within said bore, said sleeve being fixed with respect to said shaft, said sleeve and said other member being rotatable connected to said one member, wherein said sleeve has an outer surface, said outer surface having at least one pair of adjacent axial projections.

12. The bracket according to claim 11, wherein said bore has an inner surface, said inner surface having at least one axial projection.

13. The bracket according to claim 12, wherein said axial projections of said sleeve and said bore are of substantially equal length.

14. The bracket according to claim 13, wherein said at least one pair of adjacent axial projections of said sleeve is disposed along an entire axial length of said sleeve.

15. The bracket according to claim 14, wherein said at least one axial projection of said bore is disposed along a portion of an axial length of said bore.

16. The bracket according to claim 15, wherein said sleeve has two pairs of adjacent axial projections.

17. The bracket according to claim 16, wherein said sleeve has three pairs of adjacent axial projections.

18. The bracket according to claim 17, wherein said sleeve and said shaft are fixedly connected to each other by a flat surface disposed on an outer surface of said shaft that mates with a flat surface disposed an inner surface of said sleeve.

19. The bracket according to claim 11 wherein said one member includes a first portion having a first thickness and a second portion having a second thickness, said first thickness being less than said second thickness.

20. The bracket according to claims 19, wherein said bore is disposed within said second portion of said one member.

21. The bracket according to claim 20, wherein said bore is a throughbore.

22. A bracket to mount a snowboard to a wall, the snowboard including a top surface, a bottom surface and a side edge extending lengthwise along the snowboard between the top and bottom surfaces, the bracket comprising:

a first rigid member adapted to be mounted to the wall; and a second rigid member rotatably attached to the first rigid member, the second rigid member being adapted to rotate between a first position wherein the bracket is arranged to secure the snowboard, and a second position wherein the bracket is arranged to release the snowboard;

wherein the first rigid member includes first locking element and the second rigid member includes a second locking element adapted to mate with the first locking element to inhibit rotation of the second rigid member and lock the second rigid member in the first position;

wherein one of the first and second rigid members includes a support surface adapted to engage and support the side edge of the snowboard; and wherein the second rigid member is constructed and arranged to intersect a plane defined by the support surface when in the first position, and to not intersect the plane when in the second position.

23. The bracket recited in claim 22, wherein the first rigid member includes a first surface that is adapted to extend along the wall when the first rigid member is mounted thereto, and wherein the second rigid member is rotatably attached to the first rigid member about an axis that is perpendicular to the first surface of the first rigid member.

24. The bracket recited in claim 23, in combination with the snowboard.

25. The bracket recited in claim 22, in combination with the snowboard.

26. An apparatus, comprising, in combination:

a snowboard including a top surface and a bottom surface; and a bracket adapted to mount the snowboard to a wall, the bracket comprising:
 a base adapted to be attached to the wall; and
 means, supported by the base, for mounting the snowboard to the wall with the top and bottom surfaces of the snowboard being substantially parallel to the wall, the means for mounting including rotatable means for securing and releasing the snowboard and release for inhibiting rotation of the rotatable means and locking the rotatable means in a position for securing the snowboard.

27. A bracket to mount a snowboard to a wall, the snowboard including a top surface, a bottom surface and a side edge extending lengthwise along the snowboard between the top and bottom surfaces, the bracket comprising:

a first member including a first surface adapted to be attached to the wall; and a second member rotatable attached to the first member about a pivot axis that is perpendicular to the first surface of the first member, the second member being adapted to rotate between a first position wherein the bracket is arranged to secure the snowboard and a second position wherein the bracket is arranged to release the snowboard;

wherein the first member includes a first locking element and the second member include a second locking element adapted to mate with the first locking element to inhibit rotation of the first member and lock the second member in the first position;

wherein one of the first and second members includes a support surface, extending from the one of the first and second members toward the other of the first and second members, that is adapted to support the side edge of the snowboard; and wherein when the second member is placed in the first position, the second member intersects a plane, and when the second member is placed in the second position, the second member does not intersect the plane.

28. The bracket recited in claim 27, in combination with the snowboard.

29. An apparatus, comprising, in combination:

a snowboard having a top surface adapted to support a person thereon, a bottom surface adapted to slide on snow, and a side edge extending lengthwise along the snowboard between the top and bottom surfaces; and a bracket constructed and arranged to be mounted to a support member, the bracket including a first member having a mounting surface that is adapted to engage the support member when the bracket is mounted to the support member and a second member rotatably attached to the first member about an axis that is perpendicular to the mounting surface, the bracket receiving a portion of the snowboard between the first and second members to mount the snowboard to the support member the second member, being adapted to rotate between a first position wherein the bracket secures the snowboard and a second position wherein the bracket releases the snowboard, wherein the first member includes a first locking element and the second member includes a second locking element adapted to mate with the first locking element to inhibit rotation of the second member and lock the second member in the first position.

30. The apparatus recited in claim 29, wherein in the first position the second member is spaced from and disposed opposite the first member to form a recess therebetween that receives the side edge of the snowboard.

31. The apparatus recited in claim 22, further in combination with the support member, wherein the support member is a wall.

32. The apparatus recited in claim 31, wherein the top and bottom surfaces of the snowboard are disposed parallel to the wall.

33. The apparatus recited in claim 31, wherein the wall is vertical.

34. An apparatus, comprising, in combination:

a wall;

a snowboard having a top surface adapted to support a person thereon, a bottom surface adapted to slide on snow, and a side edge extending lengthwise along the snowboard between the top and bottom surfaces; and a bracket including a first rigid member mounted to the wall and a second rigid member rotatably attached to the first rigid member about an axis that is perpendicular to the wall, the bracket receiving a portion of the snowboard between the first and second rigid members to mount the snowboard to the wall, the second rigid member being adapted to rotate between a first position wherein the bracket secures the snowboard and a second position wherein the bracket releases the snowboard, wherein the first rigid member includes a first locking element and the second rigid member includes a second locking element adapted to mate with the first locking element to inhibit rotation of the second rigid member and lock the second rigid member in the first position.

* * * * *

UNITED STATES PATENT AND TRADEMARK OFFICE
CERTIFICATE OF CORRECTION

PATENT NO. : 5,799,915
DATED : September 1, 1998
INVENTOR(S) : Dennis Earl Morey It is certified that error appears in the above-identified patent and that said Letters Patent is hereby corrected as shown below:

IN THE CLAIMS:

In claim 1, line 4, replace "rotatable" with --rotatably--;
In claim 1, line 13, replace "include" with --includes--;
In claim 11, line 12, replace "rotatable" with --rotatably--;
In claim 22, line 14, replace "includes first" with --includes a first--;
In claim 26, line 12, replace "release" with --means--;
In claim 27, line 8, replace "rotatable" with --rotatably--;
In claim 29, line 15, replace "member the second member, being" with --member, the second member being--; and
In claim 31, line 1, replace "claim 22" with --claim 29--.

Signed and Sealed this

Eighth Day of December, 1998

Attest:

BRUCE LEHMAN

Attesting Officer

Commissioner of Patents and Trademarks